(12) United States Patent
Dubois et al.

(10) Patent No.: US 7,941,018 B2
(45) Date of Patent: May 10, 2011

(54) BLOCK-TERMINATED FIBER FOR LASER GENERATION OF ULTRASONIC WAVES

(75) Inventors: Marc Dubois, Keller, TX (US); Thomas E. Drake, Jr., Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 63 days.

(21) Appl. No.: 12/121,507

(22) Filed: May 15, 2008
(Under 37 CFR 1.47)

(65) Prior Publication Data
US 2009/0285527 A1 Nov. 19, 2009

(51) Int. Cl.
*G02B 6/32* (2006.01)
(52) U.S. Cl. .......................................................... 385/34
(58) Field of Classification Search ............... 385/33–34
See application file for complete search history.

(56) References Cited

U.S. PATENT DOCUMENTS

| | | | |
|---|---|---|---|
| 6,961,200 B2 * | 11/2005 | Lee et al. | 360/72.1 |
| 2003/0228100 A1 * | 12/2003 | Kikuchi et al. | 385/33 |
| 2006/0263024 A1 * | 11/2006 | Dong et al. | 385/125 |
| 2007/0127867 A1 * | 6/2007 | Jin et al. | 385/27 |
| 2008/0131052 A1 * | 6/2008 | Matsumura et al. | 385/33 |

OTHER PUBLICATIONS

International Search Report and Written Opinion for PCT/US2009/043993 dated Oct. 12, 2009, 15 pages.
J.D. Shephard et al., "Single-mode mid-IR guidance in a hollow-core photonic crystal fiber", Optics Express, vol. 13, No. 18, Sep. 5, 2005 pp. 7139-7144.
T. M. Monro et al., "Chalcogenide holey fibres" Electronic Letters, IEE Stevenage, GB, col. 36, No. 24, Nov. 23, 2000 pp. 1998-2000.
Communication Pertaining to the Results of the Partial International Search for PCT/US2009/043993 dated Aug. 13, 2009, 4 pages.

* cited by examiner

*Primary Examiner* — Ryan Lepisto
*Assistant Examiner* — Eric Wong
(74) *Attorney, Agent, or Firm* — Bracewell & Giuliani LLP

(57) ABSTRACT

A laser transmission system.

17 Claims, 2 Drawing Sheets

BLOCK-TERMINATED FIBER FOR LASER GENERATION OF ULTRASONIC WAVES

BACKGROUND

This disclosure relates to transmission systems for transmitting laser beams.

DETAILED DESCRIPTION

Figure 1:
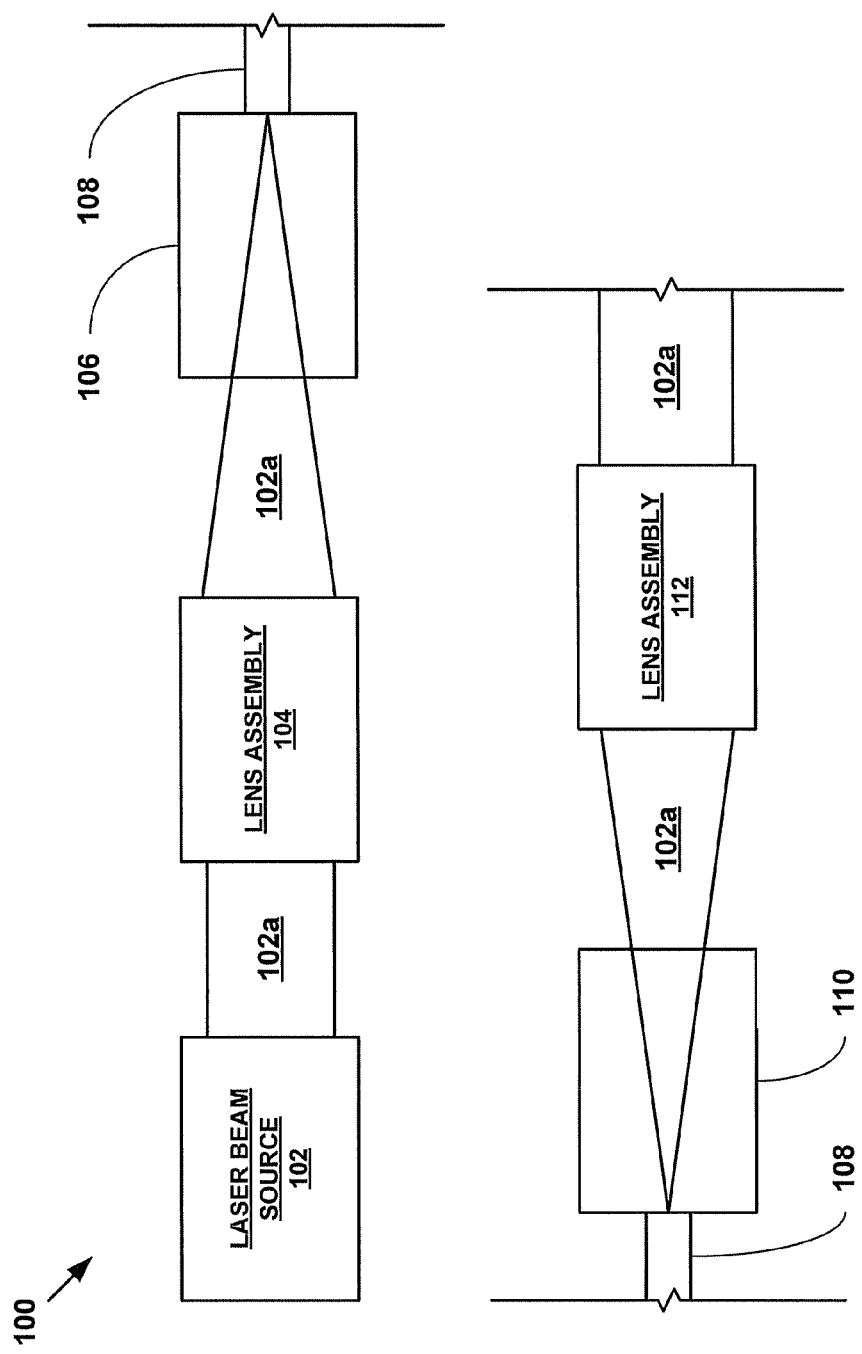
FIG. 1 is a schematic illustration of an exemplary embodiment of a laser transmission system.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring initially to FIG. 1, an exemplary embodiment of laser transmission system 100 includes a laser beam source 102 having an output that is operably coupled to the input of a lens assembly 104. The output of the lens assembly 104 is operably coupled to the input of an optically transmissive block 106. The output of the block 106 is coupled to an end of an optical fiber 108. The other end of the optical fiber 108 is coupled to input of an optically transmissive block 110. The output of the block 110 is operably coupled to the input of a lens assembly 112.

In an exemplary embodiment, the laser beam source 102 may be a conventional laser beam source such as, for example, a laser beam capable of generating wavelengths within the middle of the infra red region such as, for example, in the 3 to 5 micron range. In an exemplary embodiment, the lens assemblies, 104 and 112, may be conventional lens assemblies suitable for focusing a laser beam. In an exemplary embodiment, the blocks, 106 and 110, may be conventional optically transmissive blocks composed of a material having a refractive index similar to that of the optical fiber 108 and having minimal absorption for the wavelengths generated by the laser beam source 102. In an exemplary embodiment, the ends of the blocks, 106 and 110, may be coupled to the corresponding ends of the optical fiber 108 by conventional methods such as, for example, bonding, casing, fusing, or any other techniques capable of providing minimal optical interference. In an exemplary embodiment, the diameter of the blocks, 106 and 110, are significantly greater than the diameter of the optical fiber 108. In an exemplary embodiment, the diameter of the blocks, 106 and 110, are larger than the diameter of the beam 102a at the ends of the blocks positioned in opposing relation to the lens assemblies, 104 and 112, respectively, taking into account the length of the blocks and the numerical aperture and diameter of the optical fiber 108. In an exemplary embodiment, the lengths of the blocks, 106 and 112, are significant relative to the focal lengths of the lens assemblies, 104 and 112, such that the diameter of the laser beam 102a is significantly larger at the ends of the blocks versus at the ends of the optical fiber 108.

In an exemplary embodiment, during the operation of the system 100, the laser beam source 102 generates a laser beam 102a that is then focused by the lens assembly 104. The focused laser beam 102a then passes into the block 106 and enters into and through the end of the fiber 108. At the other end of the end of the fiber 108, the laser beam 102a exits and passes into and through the block 110. As the laser beam 102a passes through and out of the block 110, the laser beam spreads and is then focused by the lens assembly 112.

Figure 2:
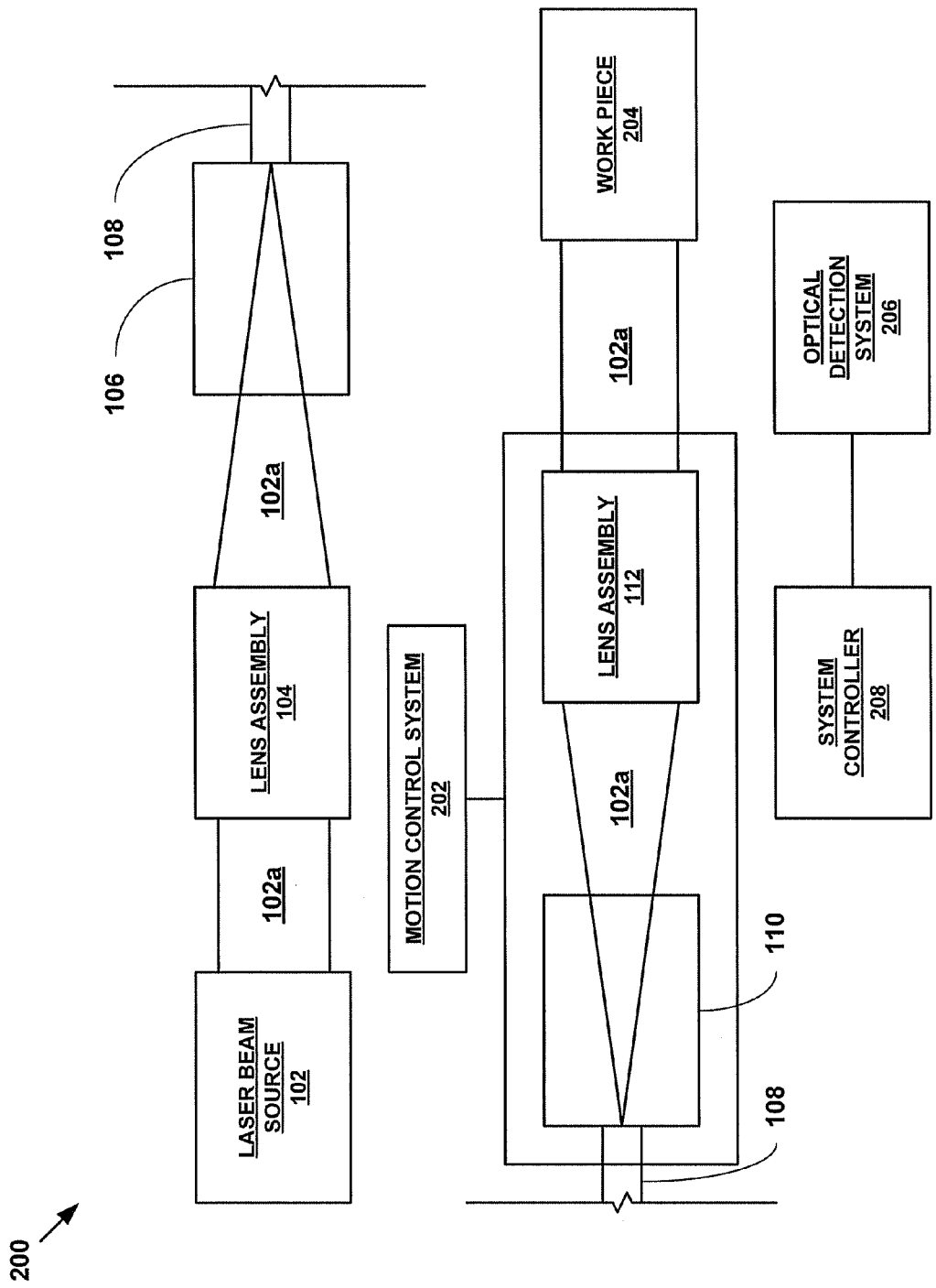
FIG. 2 is a schematic illustration of an exemplary embodiment of a laser ultrasound detection system that incorporates the laser transmission system of FIG. 1.

Referring now to FIG. 2, in an exemplary embodiment, the system 100 is incorporated into a laser ultrasound system 200 in which the block 110 and lens assembly 112 are operably coupled to a motion control system 202 for controllably moving the block and lens assembly relative to a work piece 204. A conventional optical detection system 206 is also provided proximate the work piece 204 that is operably coupled to a system controller 208. In an exemplary embodiment, the motion control system 202 may include, for example, a robotic arm.

In an exemplary embodiment, during the operation of the laser ultrasound system 200, the system 100 is operated by the system controller 208 to focus the laser beam 102a onto the surface of the work piece 204. In an exemplary embodiment, during the operation of the system 200, the motion control system 202 may be operated to position and orient the block 110 and lens assembly 112 relative to one or more exterior surfaces of the work piece 204. Optical energy reflected by the exterior surfaces of the work piece 204 is then detected by the optical detection system 206 and processed, by the system controller 208 in a well known manner to inspect the workpiece 204. The design and operation of using laser beam energy for laser ultrasound inspection of a work piece is considered well known to persons having ordinary skill in the art.

In an exemplary embodiment, the diameters and lengths of the blocks, 106 and 110, are selected such that the diameter of the beam 102a at the open ends of the blocks that are positioned in opposing relation to the lens assemblies, 104 and 112, is about 5 to 100 times greater than the diameter of the optical fiber 108.

It is understood that variations may be made in the above without departing from the scope of the invention. Further, spatial references are for the purpose of illustration only and do not limit the specific orientation or location of the structure described above. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A system for transmitting laser beams, comprising:
   a laser beam source;
   a first lens assembly operably coupled to the source, the first lens assembly causing the laser beam to converge from a larger diameter at an outlet of the first lens assembly to a smaller diameter;
   a first optically transmissive block operably coupled to the first lens assembly and have flat inlet and outlet ends for receiving the laser beam, the first optically transmissive block causing the laser beam to continue converging to a smaller diameter at an outlet of the first optically transmissive block;
   an inlet end of an optical fiber physically abutting and coupled to the outlet end of the first optically transmissive block;
   a second optically transmissive block having flat inlet and outlet ends, the inlet end of the second optically transmissive block being in physical abutment with and coupled to the an outlet end of the optical fiber, the second optically transmissive block causing the laser beam to diverge from a smaller diameter at the inlet end of the second optically transmissive block to a larger diameter at the outlet end of the second optically transmissive block;
   wherein a diameter of the first optically transmissive block and a diameter of the second optically transmissive block are each significantly larger than a diameter of the first optical fiber; and
   a second lens assembly operably coupled to the outlet end of second optically transmissive block, the second lens assembly directing the laser beam from to a target.

2. The system of claim 1, wherein the the second lens assembly collimates the laser beam to a constant diameter.

3. The system of claim 1, wherein a refractive index of at least one of the first and second optically transmissive blocks is about the same as a refractive index of the optical fiber.

4. The system of claim 1, wherein the diameters of the first and second optically transmissive blocks range from about 5 to 100 times greater than the diameter of the optical fiber.

5. The system of claim 1, further comprising a motion control system operably coupled to the second optically transmissive block and the second lens assembly for controllably displacing the second optically transmissive block and the second lens assembly with respect to a workpiece.

6. A method of transmitting a laser beam from a laser beam source to a work piece, comprising:
   providing first and second optically transmissive blocks, each block having a flat inlet end and a flat outlet end;
   abutting and joining an inlet end of an optical fiber to the outlet end of the first optically transmissive block and an outlet end of the optical fiber to the inlet end of the second optically transmissive block, each of the optically transmissive blocks being larger in diameter than the optical fiber;
   focusing the laser beam using a first lens assembly such that the laser beam converges from a larger diameter at an outlet of the first lens assembly to a smaller diameter at the inlet end of the first optically transmissive block;
   then transmitting the laser beam into and through the first optically transmissive block, causing the laser beam to continue to converge within the first optically transmissive block;
   then transmitting the laser beam from the outlet end of the first optically transmissive block into and through the optical fiber;
   then transmitting the laser beam out of the outlet end of the optical fiber into and through the second optically transmissive block, the laser beam diverging from a smaller diameter at the inlet end to a larger diameter at the outlet end of the second optically transmissive block; and
   causing the laser beam to continue to diverge from the outlet end of the second optically transmissive block to an inlet of a second lens assembly, then collimating the laser beam to a constant diameter using the second lens assembly.

7. The method of claim 6, wherein the laser beam source comprises a source of laser beams having wavelengths in the range of 3 to 5 microns.

8. The method of claim 6, wherein a refractive index of at least one of the first and second optically transmissive blocks is about the same as a refractive index of the optical fiber.

9. The method of claim 6, wherein the diameters of the first and second optically transmissive blocks range from about 5 to 100 times greater than the diameter of the optical fiber.

10. The method of claim 6, further comprising controllably displacing the second optically transmissive block and the second lens assembly with respect to a workpiece.

11. The system according to claim 1, wherein the first optically transmissive block has a length selected such that the laser beam passing through converges to a diameter at the outlet end of the first optically transmissive block that is no greater than a diameter of the optical fiber.

12. The system according to claim 1, wherein the second optically transmissive block has a length selected such that the laser beam passing through diverges to a diameter at the outlet end of the second optically transmissive block that is no greater than a diameter of the second optically transmissive block.

13. The system according to claim 1, wherein the constant diameter of the laser beam at an outlet of the second lens assembly is greater than a diameter of the optical fiber.

14. The method according to claim 6, wherein the first optically transmissive block has a length selected such that the laser beam passing through converges to a diameter at the outlet end of the first optically transmissive block that is no greater than a diameter of the optical fiber.

15. The method according to claim 6, wherein the second optically transmissive block has a length selected such that the laser beam passing through diverges to a diameter at the outlet end of the second optically transmissive block that is no greater than the diameter of the second optically transmissive block.

16. The method according to claim 6, wherein the constant diameter of the laser beam at an outlet of the second lens assembly is greater than a diameter of the optical fiber.

17. A system for transmitting laser beams, comprising:
   a laser beam source;
   a first lens assembly operably coupled to the laser beam source, the first lens assembly receiving a single laser beam from the source and causing the laser beam to conically converge;
   a first optically transmissive block having a flat inlet end optically coupled to the first lens assembly for receiving the laser beam, the laser beam having a smaller diameter at the inlet end of the first optically transmissive block than at an outlet of the first lens assembly, the first optically transmissive block having a diameter greater than the diameter of the laser beam at the inlet end of the first optically transmissive block, the first optically transmissive block causing the laser beam to continue converging at a same rate of convergence to a smaller diameter at an outlet end of the first optically transmissive block, the outlet end of the first optically transmissive block being flat;

an inlet end of an optical fiber abutting and coupled to the outlet end of the first optically transmissive block, the optical fiber having a diameter smaller than a diameter of the laser beam between the source and the first lens assembly;

a second optically transmissive block having a flat inlet end in abutting and coupled to an outlet end of the optical fiber, the second optically transmissive block causing the laser beam to diverge from a smaller diameter at the inlet end to a larger diameter at the outlet end of the second optically transmissive block, the outlet end of the second optically transmissive block being flat;

wherein a diameter of the first optically transmissive block and a diameter of the second optically transmissive block are each larger than the diameter of the first optical fiber; and a second lens assembly optically coupled to the outlet end of the second optically transmissive block, the laser beam having a larger diameter at an inlet of the second lens assembly than at the outlet end of the second optically transmissive block, the second lens assembly collimating the laser beam from divergence to a constant diameter that is larger than a diameter of the fiber.

* * * * *